United States Patent
Dash et al.

(10) Patent No.: US 12,216,635 B2
(45) Date of Patent: Feb. 4, 2025

(54) LINKING TABULAR COLUMNS TO UNSEEN ONTOLOGIES

(71) Applicant: INTERNATIONAL BUSINESS MACHINES CORPORATION, Armonk, NY (US)

(72) Inventors: Sarthak Dash, Jersey City, NJ (US); Sugato Bagchi, White Plains, NY (US); Nandana Sampath Mihindukulasooriya, Dublin (IE); Alfio Massimiliano Gliozzo, Brooklyn, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 18/330,320

(22) Filed: Jun. 6, 2023

(65) Prior Publication Data
US 2024/0411741 A1   Dec. 12, 2024

(51) Int. Cl.
*G06F 16/20* (2019.01)
*G06F 16/21* (2019.01)
(Continued)

(52) U.S. Cl.
CPC ........ *G06F 16/2282* (2019.01); *G06F 16/211* (2019.01); *G06F 40/284* (2020.01)

(58) Field of Classification Search
CPC .......................... G06F 16/2282; G06F 16/211
See application file for complete search history.

(56) References Cited

U.S. PATENT DOCUMENTS 8,099,382 B2   1/2012   Liu
8,214,378 B2   7/2012   Kohlhammer
(Continued)

FOREIGN PATENT DOCUMENTS

| KR | 100842263 B1 | 6/2007 |
|---|---|---|
| KR | 102385983 B1 | 9/2021 |
| KR | 20220004574 A | 1/2022 |

OTHER PUBLICATIONS

Zhu et al., Permutation-Invariant Tabular Data Synthesis. 2022 IEEE International Conference on Big Data (Big Data), Osaka, Japan, 2022 pp. 5855-5864. [retrieved online Jun. 5, 2024]. Retrieved from the Internet: doi: 10.1109/BigData55660.2022.10020639 (Year: 2022).*

(Continued)

*Primary Examiner* — Kristopher Andersen
(74) *Attorney, Agent, or Firm* — Robert R. Aragona

(57) ABSTRACT

An embodiment for improved linking of tabular columns to column types in an ontology unseen during training. The embodiment may for a target table, encode a target tabular query column, table headers, and target types independently to generate permutation invariant representations of tabular data associated with the target table. The embodiment may, for each of the target types, extract and further encode auxiliary information. The embodiment may process the encoded tabular data to obtain a first vector and a second vector. The embodiment may concatenate the first vector and the second vector to generate a final query vector. The embodiment may process the encoded target types through a third transformer to obtain a third vector. The embodiment may calculate a score to model interactions between the target tabular query column of the target table and the target types.

20 Claims, 5 Drawing Sheets

(51) Int. Cl.
  *G06F 16/22* (2019.01)
  *G06F 40/284* (2020.01)

(56) References Cited

U.S. PATENT DOCUMENTS

| | | | |
|---|---|---|---|
| 11,080,607 B1 | 8/2021 | Demtchenko | |
| 11,188,585 B2 | 11/2021 | Yanosy, Jr. | |
| 11,256,995 B1 | 2/2022 | Bucher | |
| 11,263,534 B1 | 3/2022 | Prat | |
| 2021/0090692 A1 | 3/2021 | Schmeink | |
| 2021/0286942 A1 | 9/2021 | Benson | |
| 2022/0051126 A1* | 2/2022 | Quader | G06F 18/214 |
| 2023/0316147 A1* | 10/2023 | Dias Barata | G06N 20/00 706/12 |
| 2023/0418848 A1* | 12/2023 | Clinchant | G06F 40/40 |

OTHER PUBLICATIONS

Abdelmageed, et al, "JenTab Meets SemTab 2021's New Challenges", SemTab@ISWC 2021, https://paperswithcode.com/paper/jentab-meets-semtab-2021-s-new-challenges, Accessed on May 18, 2023, 15 Pages.

Chen, et al., "Learning Semantic Annotations for Tabular Data", arXiv:1906.00781v1 [cs.DB], May 30, 2019, 7 Pages.

Cohen-Karlik, et al., "Regularizing Towards Permutation Invariance in Recurrent Models", 34th Conference on Neural Information Processing Systems, (NeurIPS 2020), 11 pages.

Cutrona, et al., "Tough Tables: Carefully Evaluating Entity Linking for Tabular Data", Springer International Publishing, The Semantic Web—ISWC 2020, Lecture Notes in Computer Science, 18 pages.

Dash, et al., "Permutation Invariant Strategy Using Transformer Encoders for Table Understanding", Findings of the Association for Computational Linguistics, NAACL 2022, 14 Pages,.

Deng, et al., "TURL: Table Understanding through Representation Learning", Proceedings of the VLDB Endowment, vol. 14, No. 3., 2021, pp. 307-319.

Disclosed Anonymously, "Explainability of Automatically Trained ML Models", ip.com, IPCOM000268322D; Jan. 24, 2022, 4 Pages.

Disclosed Anonymously, "Optimize Agile Project Execution Plans by Mining User Story Inter-dependencies via Machine Learning Techniques", IP.com, IPCOM000268697D, Feb. 16, 2022, 10 Pages.

Disclosed Anonymously, "Spatial-Temporal Skeleton Transformers for Action Recognition", IP.com, IPCOM000266923D, Sep. 1, 2021, 8 Pages.

Habibi, et al., "DeepTable: a permutation invariant neural network for table orientation classification", Springer, Data Mining and Knowledge Discovery (2020), Sep. 8, 2020, 21 Pages.

Hendrycks, et al., "Gaussian Error Linear Units (GELUs)", arXiv:1606.08415v4 [cs.LG], Jul. 8, 2020, 9 Pages.

Hu, et al., "VizNet: Towards A Large-Scale Visualization Learning and Benchmarking Repository", CHI 2019, May 4-9, 2019, ACM, pp. 1-12.

Hulsebos, et al., "Sherlock: A deep learning approach to semantic data type detection", Proceedings of the 25th ACM SIGKDD International Conference on Knowledge Discovery & Data Mining. Aug. 4-8, 2019, 9 Pages.

Iida, et al., "TABBIE: Pretrained Representations of Tabular Data", Proceedings of the 2021 Conference of the North American Chapter of the Association for Computational Linguistics: Human Language Technologies, Jun. 6-11, 2021, pp. 3446-3456.

Jimenez-Ruiz, "Sem Tab 2019: Resources to Benchmark Tabular Data to Knowledge Graph Matching Systems", ResearchGate, Conference Extended Semantic Web Conference (ESWC), Jun. 2020, 17 Pages. https://www.researchgate.net/publication/339851253_SemTab_2019_Resources_to_Benchmark_Tabular_Data_to_Knowledge_Graph_Matching_Systems.

Jimenez-Ruiz, et al., "Results of SemTab 2020", CEUR Workshop Proceedings, 2020, 9 Pages. https://openaccess.city.ac.uk/id/eprint/25441/1/.

Johnson, et al., "Billion-scale similarity search with GPUs", arXiv:1702.08734v1 [cs.CV], Feb. 28, 2017, 12 Pages.

Kalra, et al., "Learning Permutation Invariant Representations using Memory Networks", ArXiv, Jul. 3, 2020, 17 pages. arXiv:1911.07984v2[cs.LG].

Khattab, et al., "ColBERT: Efficient and Effective Passage Search via Contextualized Late Interaction over BERT", arXiv:2004.12832v2 [cs. IR] Jun. 4, 2020, 10 Pages.

Lee, et al., "Set Transformer: A Framework for Attention-based Permutation-Invariant Neural Networks", Proceedings of the 36th International Conference on Machine Learning, 2019, 10 Pages. http://proceedings.mlr.press/v97/lee19d/iee19d.pdf.

McCray, "An upper-level ontology for the biomedical domain", Comparative and Functional Genomics, Comp Funct Genom 2003; pp. 80-84.

Mell et al., "The NIST Definition of Cloud Computing", Recommendations of the National Institute of Standards and Technology, NIST Special Publication 800-145, Sep. 2011, 7 pages.

Mulwad, et al., "Using linked data to interpret tables", ResearchGate, Nov. 2010, 13 Pages. https://www.researchgate.net/publication/228806432_Using_linked_data_to_interpret_tables.

Pang, et al., SetRank: Learning a Permutation-Invariant Ranking Model for Information Retrieval, arXiv:1912.05891v1 [cs.IR], Dec. 12, 2019, 11 Pages.

Ritze, et al., "Matching HTML Tables to DBpedia", Wims, 2015, ACM, 6 Pages.

Santoro, et al., "A simple neural network module for relational reasoning", 31st Conference on Neural Information Processing Systems, NIPS, 2017, 10 pages. https://proceedings.neurips.cc/paper/2017/file/e6acf4b0f69f6f6e60e9a815938aa1ff-Paper.pdf.

Suhara, et al., "Annotating cols. with Pre-trained Language Models", arXiv:2104.01785v2 [cs.DB], Mar. 1, 2022, 15 pages.

Vinyals, et al., "Order Matters: Sequence to Sequence for Sets", ICLR, Feb. 23, 2016, 11 pages. arXiv:1511.06391v4[stat.ML].

Yang, et al. "Robust attentional aggregation of deep feature sets for multi-view 3D reconstruction." International Journal of Computer Vision 128.1 (2020), pp. 53-73. https://link.springer.com/content/pdf/10.1007/s11263-019-01217-w.pdf.

Zaheer, et al., "Deep Sets", 31st Conference on Neural Information Processing System, NIPS, 2017, 11 pages. https://papers.nips.cc/paper/2017/file/f22e4747da1aa27e363d86d40ff442fe-Paper.pdf.

Zhang et al., "Web Table Extraction, Retrieval and Augmentation: A Survey", arXiv:2002.00207v2 [cs.IR], Feb. 5, 2020, 31 Pages.

Zhang, et al., "Sato: Contextual Semantic Type Detection in Tables", Proceedings of the VLDB Endowment, vol. 13, No. 11, 2020, pp. 1835-1848.

Dash, et al., " Permutation Invariance For Representing Linearized Tabular Data" , Application and Drawings, Filed on Jun. 17, 2022, 33 Pages, Related U.S. Appl. No. 17/807,461.

IBM: List of IBM Patents or Patent Applications Treated as Related (Appendix P), Jun. 1, 2023, 2 pages.

* cited by examiner

500

| Ontological artifacts used | Encoder(s) | WikiData | | DBPedia | | |
|---|---|---|---|---|---|---|
| | | MRR | H@1 | MRR | H@1 | H@3 |
| Type labels only (Baselines) | TinyBERT | 0.84 | 0.741 | 0.465 | 0.306 | 0.569 |
| | BERTBase | 0.891 | 0.816 | 0.395 | 0.294 | 0.448 |
| | BERTBase + WD-to-DBP lookup | 0.891 | 0.816 | 0.192 | 0.154 | 0.210 |
| | TAPASBase + BERTBase | 0.884 | 0.804 | 0.378 | 0.292 | 0.422 |
| | TABBIE + BERTBase | 0.702 | 0.533 | 0.279 | 0.167 | 0.348 |
| Type labels + Glossary | TinyBERT | 0.857 | 0.764 | 0.489 | 0.374 | 0.531 |
| | BERTBase | 0.891 | 0.814 | 0.380 | 0.260 | 0.444 |
| | TAPASBase + BERTBase | 0.853 | 0.759 | 0.435 | 0.287 | 0.537 |
| Type labels + Glossary + is-a parent labels | TinyBERT + GraphConv (h=2) | 0.859 | 0.767 | 0.395 | 0.244 | 0.478 |
| | TinyBERT + GATConv (h=2) | 0.857 | 0.766 | 0.445 | 0.313 | 0.497 |
| | TinyBERT (*Baseline1* encoding, h=2) | 0.843 | 0.746 | 0.468 | 0.325 | 0.562 |
| | TinyBERT (*Baseline2* encoding, h=2) | 0.859 | 0.770 | 0.424 | 0.267 | 0.520 |
| | TinyBERT (*PI* encoding, h=1) | 0.847 | 0.750 | 0.496 | 0.375 | 0.563 |
| | TinyBERT (*PI* encoding, h=2) | 0.854 | 0.762 | 0.533 | 0.404 | 0.601 |

Figure 5

LINKING TABULAR COLUMNS TO UNSEEN ONTOLOGIES

BACKGROUND

The present application relates generally to computers, and more particularly, to linking tabular columns to column types in an ontology unseen during training.

Enterprise data assets are increasingly stored in various types of infrastructure, ranging from in-house database management systems on owned infrastructure to rented services on cloud infrastructure. To manage their distributed data assets, businesses invest in 'data lakes' that provide a unified view of metadata associated with the assets regardless of location. Although this metadata may include names of databases, tables, columns, and associated database schemas, it typically lacks mapping to an external ontology of interest. Businesses may benefit from such mapping to a specific ontology as it allows a given data consumer to better discover, augment, and visualize information from a data lake.

SUMMARY

According to one embodiment, a method, computer system, and computer program product for linking tabular columns to column types in an ontology unseen during training is provided. The embodiment may include for a target table, encoding a target tabular query column, table headers, and target types independently to generate permutation invariant representations of type data associated with a target ontology and tabular data associated with the target table, wherein encoding the target types further includes encoding associated auxiliary information. The embodiment may further include processing the encoded tabular query column using a first transformer to obtain a first vector and the encoded table headers using a second transformer to obtain a second vector. The embodiment may also include concatenating the first vector and the second vector to obtain a combined vector, wherein the combined vector is then processed through a linear layer, and a Gaussian Error Linear Unit layer to obtain a final query vector. The embodiment may further include processing the encoded target types through a third transformer to obtain a third vector. The embodiment may also include calculating a score for the target tabular query column as a dot product between the final query vector and the third vector to model interactions between the target tabular query column of the target table and the target types.

BRIEF DESCRIPTION OF THE SEVERAL VIEWS OF THE DRAWINGS

These and other objects, features and advantages of the present disclosure will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings:

FIG. 5 illustrates evaluation data for results associated with a column-type annotation task performed by a system capable of performing illustrative process of linking tabular columns to column types in an ontology unseen during training according to at least one embodiment.

DETAILED DESCRIPTION

Figure 1:
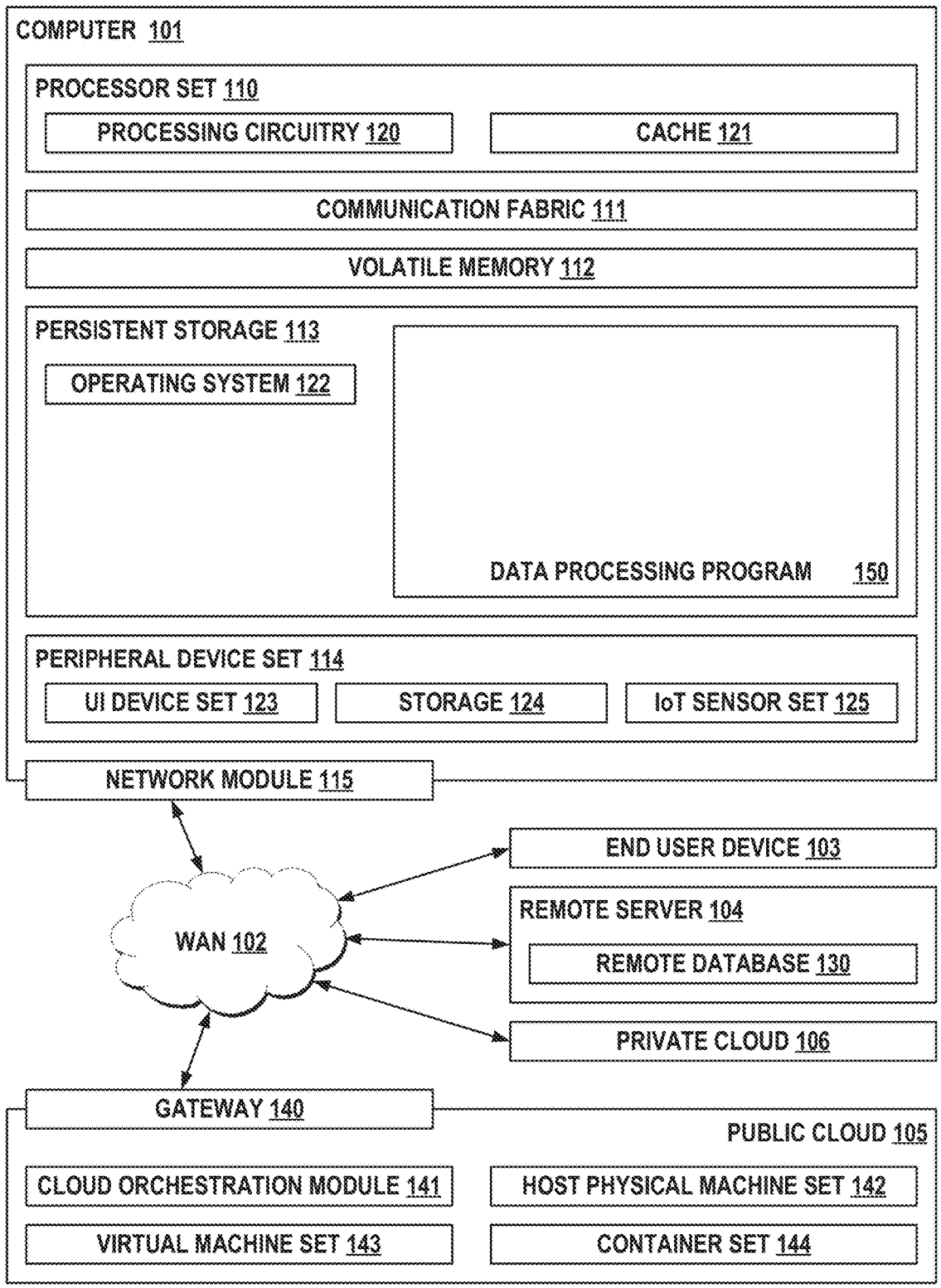
FIG. 1 illustrates an exemplary networked computer environment according to at least one embodiment.

Detailed embodiments of the claimed structures and methods are disclosed herein; however, it can be understood that the disclosed embodiments are merely illustrative of the claimed structures and methods that may be embodied in various forms. The present disclosure may, however, be embodied in many different forms and should not be construed as limited to the exemplary embodiments set forth herein. In the description, details of well-known features and techniques may be omitted to avoid unnecessarily obscuring the presented embodiments.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

Embodiments of the present application relate relates generally to computers, and more particularly, to linking tabular columns to column types in an ontology unseen during training. The following described exemplary embodiments provide a system, method, and program product to, among other things, for a target table, encode a target tabular query column, table headers, and target types independently to generate permutation invariant representations of type data associated with a target ontology and tabular data associated with the target table, wherein encoding the target types further includes encoding associated auxiliary information. Described exemplary embodiments may then process the encoded tabular query column using a first transformer to obtain a first vector and the encoded table headers using a second transformer to obtain a second vector, concatenate the first vector and the second vector to obtain a combined vector, wherein the combined vector is then processed through a linear layer, and a Gaussian Error Linear Unit layer to obtain a final query vector, process the encoded target types through a third transformer to obtain a third vector, and calculate a score for the target tabular query column as a dot product between the final query vector and the third vector to model interactions between the target tabular query column of the target table and the target types. Therefore, the presently described embodiments have the capacity to improve the ability of computers to link tabular columns to column types in an ontology unseen during training by leveraging transformed-based models to build semantically rich representations of type labels by using associated ontological information such as glossary and partial taxonomy structures. Presently described embodiments also leverage permutation invariant encoding strategies to encode type-labels from open-domain ontologies along with associated auxiliary information in an optimal manner to generate resulting vectors that are more suitable for downstream column-linking tasks in a zero-shot setting. This ultimately allows businesses to perform column-linking tasks in zero-shot settings involving ontologies unseen during training while avoiding conventional methods of relying upon costly and time-intensive manual annotation techniques.

In another described embodiment, encoding the target tabular query column, the table headers, and the target types independently to generate the permutation invariant representations of the type data and the tabular data associated with the target table may further include linearizing the tabular data, automatically assigning an increasing sequence of position identifiers to each non-delimiting tokenized cell in the linearized tabular data until a separator token is reached, and, in response to reaching the separator token, automatically assigning a monotonically increasing sequence of position identifiers for each non-delimiting tokenized cell positioned after the separator token, restarting from an integer corresponding to 1 greater than the position identifier assigned to the separator token.

In yet another described embodiment, the auxiliary information may include one or more of a glossary including a short description of the target label type or a partial taxonomy structure including linearized two-hop is-a ancestor labels.

In an additional described embodiment, encoding the target tabular query column, the table headers, and the target types independently to generate the permutation invariant representations of the type data and the tabular data associated with the target table may further include assigning the target types, associated glossaries, associated parent labels, and associated grand-parent labels different token identifications.

In another described embodiment, the different token identifications may be initialized to two pre-trained token type embeddings of a pre-trained transformer encoder model including two token type identifiers.

In yet another described embodiment, the method may further include leveraging a library for large-scale vector-similarity searches to increase a speed of an inferencing step.

In another embodiment, the calculated score may be determined using a MaxSim function.

An additional described embodiment may include a computer system, the computer system including one or more processors, one or more computer-readable memories, one or more computer-readable tangible storage medium, and program instructions stored on at least one of the one or more computer-readable tangible storage medium for execution by at least one of the one or more processors via at least one of the one or more computer-readable memories, wherein the computer system is capable of performing a method including: for a target table, encoding a target tabular query column, table headers, and target types independently to generate permutation invariant representations of type data associated with a target ontology and tabular data associated with the target table, wherein encoding the target types further includes encoding associated auxiliary information, processing the encoded tabular query column using a first transformer to obtain a first vector and the encoded table headers using a second transformer to obtain a second vector, concatenating the first vector and the second vector to obtain a combined vector, processing the combined vector through a linear layer and a Gaussian Error Linear Unit layer to obtain a final query vector, processing the encoded target types through a third transformer to obtain a third vector, and calculating a score for the target tabular query column as a dot product between the final query vector and the third vector to model interactions between the target tabular query column of the target table and the target types.

Yet another described embodiment may relate to a computer program product, the computer program product including one or more computer-readable tangible storage medium and program instructions stored on at least one of the one or more computer-readable tangible storage medium, the program instructions executable by a processor capable of performing a method, the method including for a target table, encoding a target tabular query column, table headers, and target types independently to generate permutation invariant representations of type data associated with a target ontology and tabular data associated with the target table, and encoding the target types may further include encoding associated auxiliary information, processing the encoded tabular query column using a first transformer to obtain a first vector and the encoded table headers using a second transformer to obtain a second vector, concatenating the first vector and the second vector to obtain a combined vector, processing the combined vector through a linear layer and a Gaussian Error Linear Unit layer to obtain a final query vector, processing the encoded target types through a third transformer to obtain a third vector, and calculating a score for the target tabular query column as a dot product between the final query vector and the third vector to model interactions between the target tabular query column of the target table and the target types.

As previously described, enterprise data assets are increasingly stored in various types of infrastructure, ranging from in-house database management systems on owned infrastructure to rented services on cloud infrastructure. To manage their distributed data assets, businesses invest in 'data lakes' that provide a unified view of metadata associated with the assets regardless of location. Although this metadata may include names of databases, tables, columns, and associated database schemas, it typically lacks mapping to an external ontology of interest. Businesses may benefit from such mapping to a specific ontology as it allows a given data consumer to better discover, augment, and visualize information from a data lake.

However, over time, enterprises are growing to include increasing numbers of data consumer roles, thus requiring mapping of columns across multiple custom ontologies, taxonomies, or business term glossaries, often containing thousands of business terms therein. Current approaches to linking columns to target ontologies rely on rule-based systems or require training on the target ontology. However, building such a system for each data consumer role is often not feasible or cost prohibitive for a given enterprise, as it would involve relying upon costly and time-intensive manual annotation techniques. It would be advantageous to find strategies to link tabular columns to any given target ontology in an unsupervised manner.

Accordingly, a method, computer system, and computer program product for improved linking of tabular columns to column types in an ontology unseen during training is provided. The method, system, and computer program product may, for a target table, encode a target tabular query column, table headers, and target types independently to generate permutation invariant representations of type data associated with a target ontology and tabular data associated with the target table, wherein encoding the target types further includes encoding associated auxiliary information. The method, system, computer program product may then process the encoded tabular query column using a first transformer to obtain a first vector and the encoded table headers using a second transformer to obtain a second vector. Next, the method, system, computer program product may concatenate the first vector and the second vector to obtain a combined vector, wherein the combined vector is then processed through a linear layer, and a Gaussian Error Linear Unit layer to obtain a final query vector. The method, system, computer program product may then process the encoded target types through a third transformer to obtain a third vector. Thereafter, the method, system, computer program product may calculate a score for the target tabular query column as a dot product between the final query vector and the third vector to model interactions between the target tabular query column of the target table and the target types. In turn, the method, system, computer program product has provided for improved linking of tabular columns to column types in an ontology unseen during training by leveraging transformed-based models to build semantically rich representations of type labels by using associated ontological information such as glossary and partial taxonomy structures. Presently described embodiments also leverage permutation invariant encoding strategies to encode two-hop is-a ancestors of type-labels from open-domain ontologies along with associated auxiliary information in an optimal manner to generate resulting vectors that are more suitable for downstream column-linking tasks in a zero-shot setting. This ultimately allows businesses to perform column-linking tasks in zero-shot settings involving ontologies unseen during training while avoiding conventional methods of relying upon costly and time-intensive manual annotation techniques.

The present invention may be a system, a method, and/or a computer program product at any possible technical detail level of integration. The computer program product may include a computer readable storage medium (or media) having computer readable program instructions thereon for causing a processor to carry out aspects of the present invention.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Referring now to FIG. 1, computing environment 100 contains an example of an environment for the execution of at least some of the computer code involved in performing the inventive methods, such as data processing program/code 150. In addition to data processing code 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and data processing code 150, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in data processing code 150 in persistent storage 113.

COMMUNICATION FABRIC 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in data processing code 150 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101) and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

According to the present embodiment, the data processing program 150 may be a program capable of, for a target table, encoding a target tabular query column, table headers, and target types independently to generate permutation invariant representations of type data associated with a target ontology and tabular data associated with the target table, wherein encoding the target types further includes encoding associated auxiliary information. Next, data processing program 150 may process the encoded tabular query column using a first transformer to obtain a first vector and the encoded table headers using a second transformer to obtain a second vector. Data processing program 150 may then concatenate the first vector and the second vector to obtain a combined vector, wherein the combined vector is then processed through a linear layer, and a Gaussian Error Linear Unit layer to obtain a final query vector. Next, data processing program 150 may process the encoded target types through a third transformer to obtain a third vector. Thereafter, data processing program 150 may calculate a score for the target tabular query column as a dot product between the final query vector and the third vector to model interactions between the target tabular query column of the target table and the target types. Described embodiments thus provide for improved linking of tabular columns to column types in an ontology unseen during training by leveraging transformed-based models to build semantically rich representations of type labels by using associated ontological information such as glossary and partial taxonomy structures. Presently described embodiments also leverage permutation invariant encoding strategies to encode two-hop is-a ancestors of type-labels from open-domain ontologies along with associated auxiliary information in an optimal manner to generate resulting vectors that are more suitable for downstream column-linking tasks in a zero-shot setting. This ultimately allows businesses to perform column-linking tasks in zero-shot settings involving ontologies unseen during training while avoiding conventional methods of relying upon costly and time-intensive manual annotation techniques.

Figure 2:
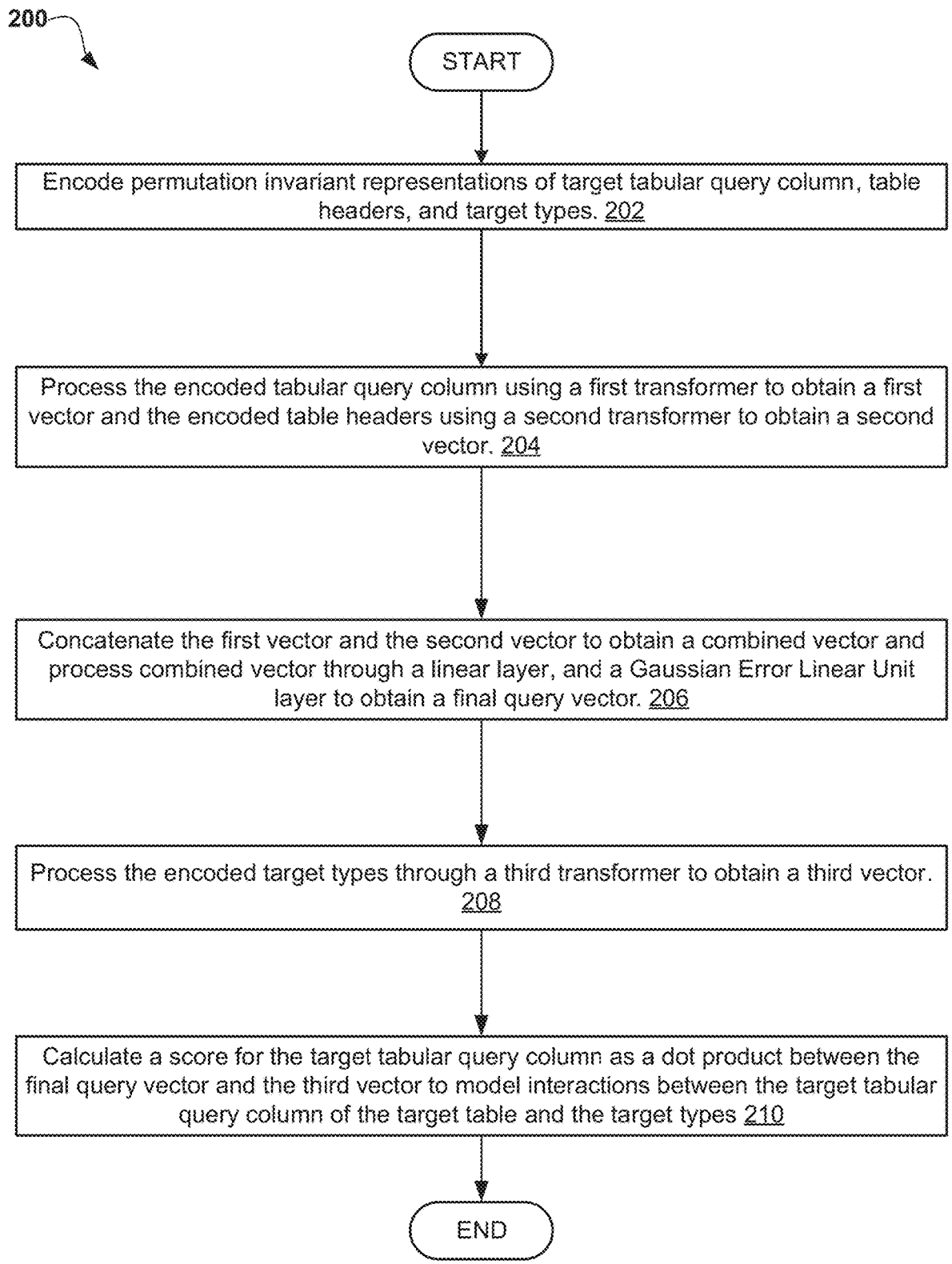
FIG. 2 illustrates an operational flowchart for a process of linking tabular columns to column types in an ontology unseen during training according to at least one embodiment.

Referring now to FIG. 2, an operational flowchart for a process 200 of linking tabular columns to column types in an ontology unseen during training according to at least one embodiment is provided.

Figure 3:
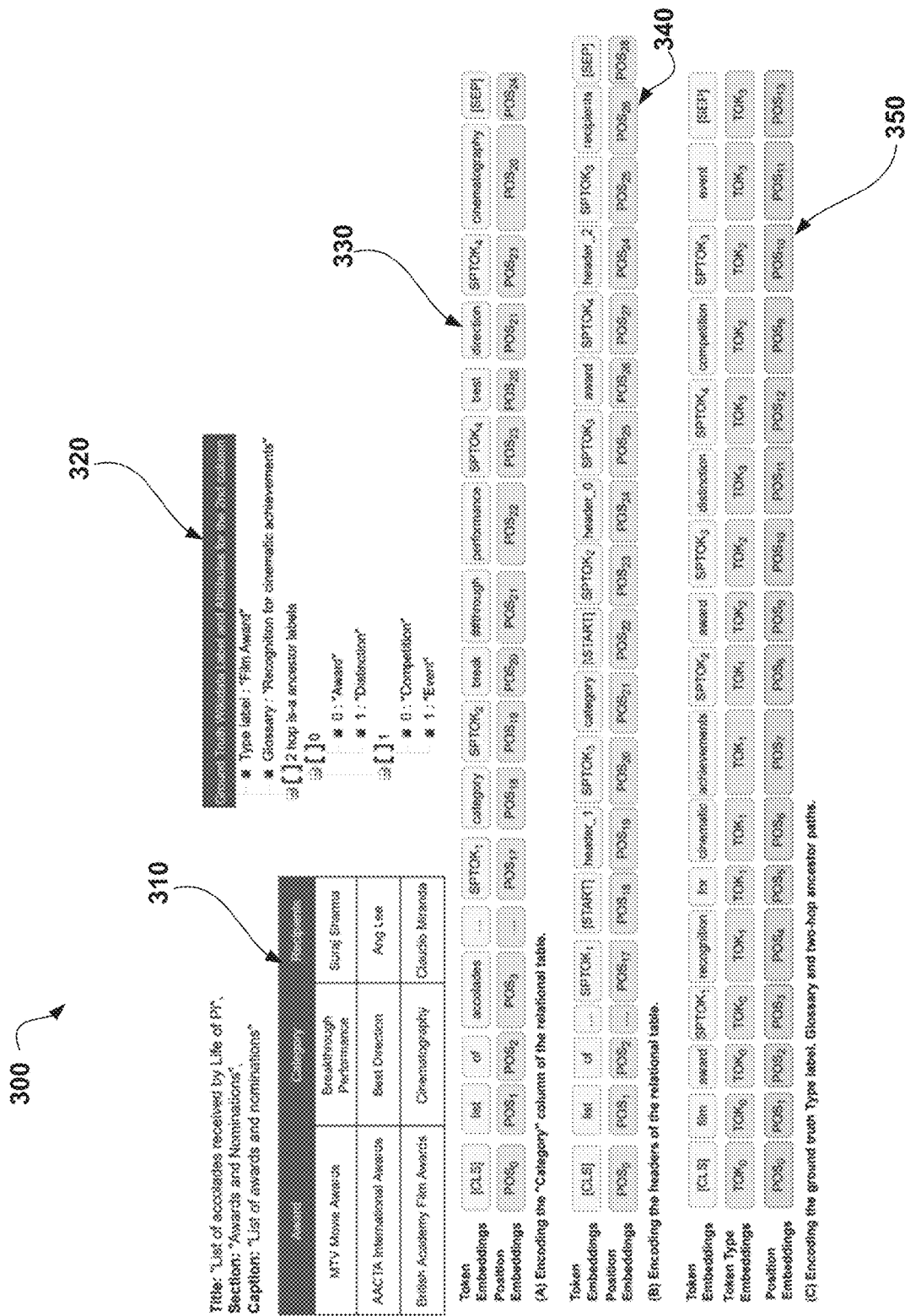
FIG. 3 illustrates an exemplary relational table, associated metadata, and associated auxiliary information for a target type that may be encoded and processed using the described methods of linking tabular columns to column types in an ontology unseen during training according to at least one embodiment.

At 202, data processing program 150 may for a target table, encode a target tabular query column, table headers, and target types independently to generate permutation invariant representations of type data associated with a target ontology and tabular data associated with the target table. In the context of this disclosure, the 'type data' refers broadly to any data associated with a target type, and may further include auxiliary information associated with a target type (discussed in greater detail below). For example, data processing program 150 may encode two-hop is-a ancestors associated with a given target type using permutation invariant encoding techniques to obtain permutation invariant representations of type data for that given target type. In the context of this disclosure a two-hop is-a ancestor label refers to any label related to an ancestor that is two levels apart (up to two hops away via a sub-class property) from a given entity. The details of step 202 will be explained in greater details below and further demonstrated through examples. FIG. 3 illustrates an exemplary relational table (target table)

310, associated metadata, and associated auxiliary information 320 for a target type that may be encoded and processed using illustrative process 200, and will be referenced throughout the description of illustrative process 200. At this step, data processing program 150 is configured to utilize encoding techniques configured to generate permutation invariant representations of the tabular data contained in the target table. For example, data processing program 150 may employ an encoding technique which first detects tabular data, linearizes a given column or row within the detected tabular data, and then automatically assigns an increasing sequence of position identifiers to each non-delimiting tokenized cell in the linearized column or row until a header delimiter (separator token) is reached. In response to reaching the separator token, data processing program 150 may then automatically assign a monotonically increasing sequence of position identifiers for each non-delimiting tokenized cell positioned after the header delimiter, restarting from an integer corresponding to 1 greater than the position identifier assigned to the header delimiter (separator token) for each non-delimiting tokenized cell positioned after cell delimiters. Thereafter data processing program 150 may automatically assign a static position identifier for each of the cell delimiters in the linearized column or row, the static position identifier being 1 greater than a highest position identifier assigned to the non-delimiting tokenized cells, and automatically output an encoded permutation-invariant representation of the linearized column or row.

The above-described permutation invariant encoding techniques utilized by illustrative data processing program 150 are shown in the encoded target tabular query column 330, the encoded table headers at 340, and the encoded target types at 350. An exemplary embodiment in which an illustrative data processing program 150 encodes the tabular data from exemplary table 310 shown in FIG. 3 will now be discussed. Regarding encoding the tabular query column, and the headers, the query column may be given as query column '$Q_c$' and the table headers for table 310 may be given as 'H'. Suppose the query column $Q_c$ to encode is the second column with the header 'Category'. The headers 'H' would thus consist of three entries: 'Award', 'Category', and 'Recipients'. In embodiments, data processing program 150 may utilize six additional special tokens $SPTOK_1$-$SPTOK_4$ and [START], [\START] for encoding using pre-trained transformer encoder models following the above-described encoding strategy as shown in FIG. 3. As shown, for encoding $Q_c$ at 330, data processing program 150 may first concatenate the title, section, and caption fields to generate the metadata text. Data processing program 150 may then append the column header, i.e., 'Category', to the metadata text using $SPTOK_1$ as the separator (token). Next, data processing program 150 may concatenate the cell mentions in column $Q_c$ using the separator token $SPTOK_4$ and then and append this sentence to the previous one using SPTOK_2. As shown in FIG. 3, the encoding of table headers 'H' may be accomplished following a similar process. For the headers, as shown in FIG. 3 at 340, data processing program 150 may concatenate other column headers using the $SPTOK_4$ token. In addition, data processing program 150 may indicate $Q_c$'s header with the [START], [START] tokens.

The position embeddings shown in FIG. 3 provide a further example of the encoding strategies discussed above that may be employed by illustrative data processing program 150. For example, in FIG. 3, the $SPTOK_2$ separator token acts as the pivot. In other words, word pieces to the left of the pivot get numerically increasing position identifiers (position IDs) whereas word pieces to the right receive position IDs that are numerically increasing but are reset as soon as the $SPTOK_4$ token is hit. Thus, when we apply the encoding techniques discussed above to the example shown in FIG. 3, the $SPTOK_4$ token always gets a position ID that is one less than the position ID of the [SEP] token. This assignment of position IDs is shown in the bottom rows of 330, 340, and 350 respectively. Data processing program 150 may use standard strategies for encoding token types and attention masks, thus illustrations are omitted for simplicity.

Lastly, it should be noted that the [CLS] vector and the [START] vector corresponding to a final transformer layer is used as the representations for the query column $Q_c$ and the table headers 'H' respectively. As discussed above, the encoding techniques employed by data processing program 150 ensure that the column representations remain unchanged even if the cell values are randomly shuffled. In other words, the column representations are invariant to the ordering of the cell values within the query column.

As mentioned above, the target tabular query column, table headers, and target types are encoded independently at step 202 to generate permutation invariant representations of type data associated with a target ontology and tabular data associated with the target table. The encoding of the target types, while similar to the above-described encoding strategies for the target tabular query column and table headers, will be discussed in greater detail below.

When encoding the target types to generate permutation invariant representations of type data associated with a target ontology, data processing program 150 may, for each of the target types, extract and further encode auxiliary information. The auxiliary information encoded for the target types by data processing program 150 may include additional information related to a target type, for example, a glossary including a short description of the target label type or a partial taxonomy structure including linearized two-hop is-a ancestor labels. The extracted auxiliary information, when included in the vectors generated by data processing program 150, ultimately lead to improved results when performing column-linking tasks (as will be shown in FIG. 5 discussed below). As stated above, a two-hop is-a ancestor label refers to any label related to an ancestor that is two levels apart (up to two hops away via a sub-class property) from a given entity. In the context of this disclosure, the 'type data' refers to data associated with a target type that includes two-hop is-a ancestors for a given target type that may be encoded using permutation invariant encoding techniques. While the permutation invariant representations of type data for a given target type may include various features related to auxiliary information associated with a target type, the two-hop is-a ancestors for a given target type are generally the subject of the permutation invariant encoding techniques.

In the exemplary encoded target types shown at 350, data processing program 150 has encoded the auxiliary information shown in the javascript object notation (JSON) structure at 320 which illustrates the target Wikidata Type 'Film Award' including a glossary, and a list of two-hop is-a ancestor labels from the ontology. Similarly, as in the encoding process described above, data processing program 150 may, for example, linearize the two-hop is-a ancestor labels. As shown in FIG. 3, the two-hop is-a ancestor labels can be viewed at 320 as a list of lists wherein the inner list (or a path) contain at most two type label strings. In the example of FIG. 3, the first list (or path) is 'Award, Distinction' and the second list is 'Competition, Event'. At this step, data processing program 150 may concatenate the type label strings for each path using the special separator token $SPTOK_3$. This results in a single list of linearized paths. Data processing program 150 may then concatenate all the paths together using the special token $SPTOK_4$ as the separator. This sequence of steps yields a linearized view of the two-hop is-a ancestor label attribute for a given target type. Thereafter, data processing program 150 may concatenate the type label and the glossary using the special token $SPTOK_1$ as the separator. Data processing program 150 may then concatenate the result with the linearized view of the two-hop is-a ancestor labels, yielding the overall pseudo sentence shown at 350. It may be noted that, in this example, data processing program 150 utilizes a total of four separator token IDs $TOK_0$-$TOK_3$. The token ID '0' is used for the type label, '1' for the glossary, '2' for the parent type labels, '3' for the grand-parent type labels. In embodiments, $TOK_0$ and $TOK_1$ may be initialized to the two pre-trained token type embeddings of a BERT-like model. In the context of this disclosure, a BERT-like model may include any pre-trained transformer encoder model that has two token type IDs. In embodiments, for $TOK_2$ and $TOK_3$, the tokens are initialized with pre-trained token type embeddings for token ID '1' of a BERT-like model generates optimal results, but alternate initialization strategies are envisioned, and shown, in FIG. 5 discussed in greater detail below. It may be noted that irrespective of how the list of paths are arranged, if data processing program 150 encodes the target type using the steps described above, and generates the position embeddings as described above, then the same representation is obtained. Thus, the embedding of the type is invariant to any permutation of the list of paths.

Figure 4:
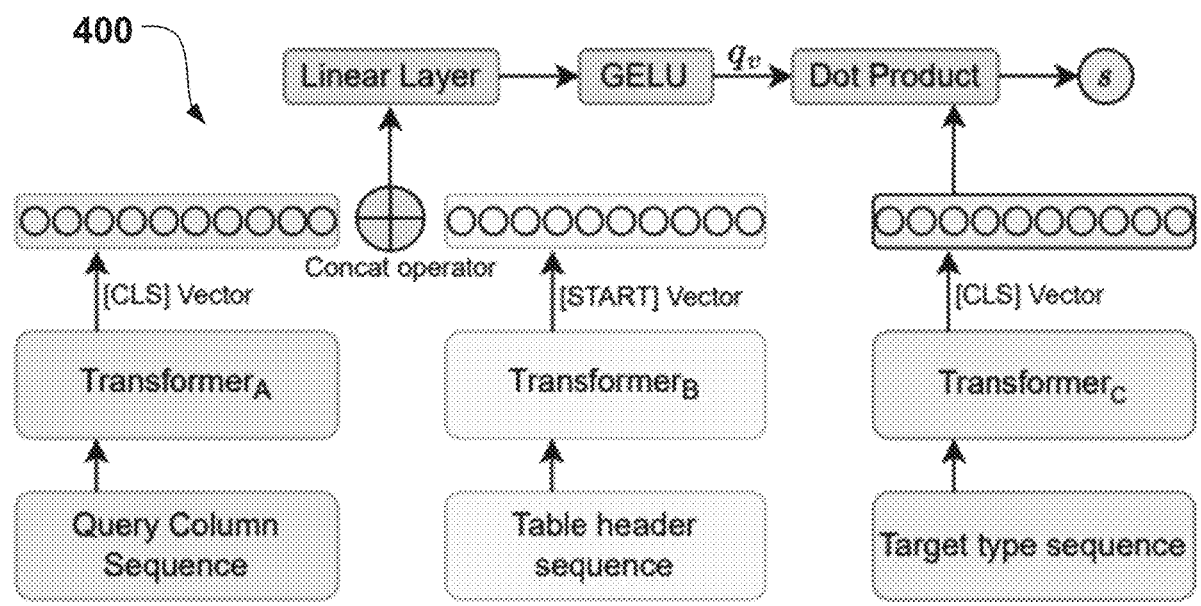
FIG. 4 illustrates a diagrammatic view of exemplary architecture and a sequence of steps that may be performed during an illustrative process of linking tabular columns to column types in an ontology unseen during training according to at least one embodiment.

Next, at 204, data processing program 150 may process the encoded tabular query column using a first transformer to obtain a first vector and the encoded table headers using a second transformer to obtain a second vector. FIG. 4 illustrates a diagrammatic view of exemplary architecture 400 and a sequence of steps that may be performed during illustrative process 200 of linking tabular columns to column types in an ontology unseen during training according to at least one embodiment. Returning to the example discussed above, this step includes data processing program 150 processing the encoded tabular query column from step 202 using a first 'Transformer$_A$', as shown in FIG. 4, to obtain a first vector. Then data processing program 150 processes the encoded table headers using a second 'Transformer$_B$', as shown in FIG. 4, to obtain a second vector. In FIG. 4, the [CLS] vector form 'Transformer$_A$' and the [START] vector from 'Transformer$_B$' are considered as representations for '$Q_C$' and 'H' discussed above.

At 206, data processing program 150 may then concatenate the first vector and the second vector to obtain a combined vector, wherein the combined vector is then processed through a linear layer, and a Gaussian Error Linear Unit (GELU) layer to obtain a final query vector. In FIG. 4, the final query vector is represented by final query vector '$q_v$'.

At 208, data processing program 150 may process the encoded target types through a third transformer to obtain a third vector. As noted above at step 202, data processing program 150 encodes the target types with auxiliary information including the associated glossary and two-hop is-a ancestor labels. At this step, data processing program 150 processes the encoded target types (including the auxiliary information) through a third transformer, 'Transformer$_c$' to generate a [CLS] vector.

Thereafter, at 210, data processing program 150 may calculate a score for the target tabular query column as a dot product between the final query vector and the third vector to model interactions between the target tabular query column of the target table and the target types. As shown in FIG. 4, the final score 's' may be calculated by data processing program 150 as a dot product between the query vector $q_v$ and the [CLS] vector produced by 'Transformer$_C$'. In embodiments, the score 's' calculated by an illustrative data processing program 150 may be calculated using a MaxSim function defined as $$'s = \max_i q_v \cdot l_i'$$

where $l_i$: $i^{th}$ vector from last layer of Transformer$_C$, and the dot represents dot-product between $q_v$ and $l_i$.

In embodiments, during a training phase, each instance, i.e., column '$Q_c$', table headers 'H' and associated table metadata, may have one or more positive ground truth (GT) types. Data processing program 150 may be configured to use random sampling to generate negative types and then score both positive and negative types using the architecture described above and shown in FIG. 4. In embodiments, data processing program 150 may further use a binary entropy loss for training. During scoring by data processing program 150, each test instance may be provided with a list of all possible type labels, glossary, and two-hop is-a ancestor label attribute information from the target ontology. Since this list stays constant across all test instances, it can be processed once through exemplary 'Transformer$_c$', and the target type representations can be pre-computed. The pre-computed target type representations may then be used, for example, to generate a ranked list of types for each test instance. In other embodiments, a user may utilize on an off-the-shelf library for performing large-scare vector-similarity searches to increase a speed of a subsequent inferencing step. Further evaluations of results may be gathered using Mean Reciprocal Rank (MRR) and hits at 'k' metrics.

FIG. 5 illustrates evaluation data for results associated with a column-type annotation task performed by an exemplary data processing program 150 capable of performing illustrative processes of linking tabular columns to column types in an ontology unseen during training according to at least one embodiment. More specifically, FIG. 5 illustrates results for a column type annotation (CTA) task on a WikiTables test fold dataset with labels from WikiData (supervised task) and DBPedia (linking to unseen ontology/zero-shot), where h=k indicates parent is-a labels up to k hops, and 'H@k' denotes hits at k metric. In the context of this disclosure the 'WikiTables dataset' refers to a dataset including all the tables present in Wikipedia (an online publicly available encyclopedia) that have been extracted and processed from a Wikipedia dump as of acertain date. The pre-processing ensures that only tables which are relational in nature, i.e. having fixed number of rows/columns are considered; all other tables are removed. The exemplary CTA task that yielded the results shown in a Table 500 of FIG. 5 were obtained by training a model once using the WikiTables training dataset annotated with Wikidata labels, initializing using a pre-trained transformer encoder and then fine tuning during a training procedure. Once training was complete on a Wikitables dataset and Wikidata ontology, the model was evaluated independently on the Wikitables dataset and DBPedia ontology. As shown in FIG. 5, using semantically enriched types with the smaller-sized transformer encoder TinyBERT, yielded better results than the CTA performed without the encoded auxiliary information, as shown in the bottom two rows of table 500. The bottom two rows of table 500 labeled as 'PI encoding' strategies correspond to encoding strategies in accordance with descriptions of illustrative process 200 that may be performed by an exemplary data processing program 150 according to at least one embodiment.

It will be appreciated that data processing program 150 thus provides for improved linking of tabular columns to column types in an ontology unseen during training by leveraging transformed-based models to build semantically rich representations of type labels by using associated ontological information such as glossary and partial taxonomy structures. Presently described embodiments also leverage permutation invariant encoding strategies to encode type-labels from open-domain ontologies along with associated auxiliary information in an optimal manner to generate resulting vectors that are more suitable for downstream column-linking tasks in a zero-shot setting. This ultimately allows businesses to perform column-linking tasks in zero-shot settings involving ontologies unseen during training while avoiding conventional methods of relying upon costly and time-intensive manual annotation techniques. While a variety of end uses are envisioned, certain embodiments may be used to provide preliminary CTA results that may be used, for example, to facilitate manual annotations.

It may be appreciated that FIGS. 2-5 provide only illustrations of an exemplary implementation and do not imply any limitations with regard to how different embodiments may be implemented. Many modifications to the depicted environment may be made based on design and implementation requirements.

The descriptions of the various embodiments of the present invention have been presented for purposes of illustration but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-based method of linking tabular columns to column types in an ontology unseen during training, the method comprising:
   for a target table, encoding a target tabular query column, table headers, and target types independently to generate permutation invariant representations of type data associated with a target ontology and tabular data associated with the target table, wherein encoding the target types further includes encoding associated auxiliary information, wherein the auxiliary information includes a partial taxonomy structure comprising linearized two-hop is-a ancestor labels;
   processing the encoded tabular query column using a first transformer to obtain a first vector and the encoded table headers using a second transformer to obtain a second vector;
   concatenating the first vector and the second vector to obtain a combined vector;
   processing the combined vector through a linear layer and a Gaussian Error Linear Unit layer to obtain a final query vector;
   processing the encoded target types through a third transformer to obtain a third vector; and
   calculating a score for the target tabular query column as a dot product between the final query vector and the third vector to model interactions between the target tabular query column of the target table and the target types and provide a column-type annotation.

2. The computer-based method of claim 1, wherein encoding the target tabular query column, the table headers, and the target types independently to generate the permutation invariant representations of the type data and the tabular data associated with the target table further comprises:
   linearizing the tabular data;
   automatically assigning an increasing sequence of position identifiers to each non-delimiting tokenized cell in the linearized tabular data until a separator token is reached; and
   in response to reaching the separator token, automatically assigning a monotonically increasing sequence of position identifiers for each non-delimiting tokenized cell positioned after the separator token, restarting from an integer corresponding to 1 greater than the position identifier assigned to the separator token.

3. The computer-based method of claim 1, wherein the auxiliary information further includes one a glossary comprising a short description of the target label type.

4. The computer-based method of claim 1, wherein encoding the target tabular query column, the table headers, and the target types independently to generate the permutation invariant representations of the type data and the tabular data associated with the target table further comprises:
   assigning the target types, associated glossaries, associated parent labels, and associated grand-parent labels different token identifications.

5. The computer-based method of claim 4, wherein the different token identifications are initialized to two pre-trained token type embeddings of a pre-trained transformer encoder model comprising two token type identifiers.

6. The computer-based method of claim 1, further comprising:
   leveraging a library for large-scale vector-similarity searches to increase a speed of an inferencing step.

7. The computer-based method of claim 1, wherein the calculated score is determined using a MaxSim function.

8. A computer system, the computer system comprising:
   one or more processors, one or more computer-readable memories, one or more computer-readable tangible storage medium, and program instructions stored on at least one of the one or more computer-readable tangible storage medium for execution by at least one of the one or more processors via at least one of the one or more computer-readable memories, wherein the computer system is capable of performing a method comprising:
   for a target table, encoding a target tabular query column, table headers, and target types independently to generate permutation invariant representations of type data associated with a target ontology and tabular data associated with the target table, wherein encoding the target types further includes encoding associated auxiliary information, wherein the auxiliary information includes a partial taxonomy structure comprising linearized two-hop is-a ancestor labels;
   processing the encoded tabular query column using a first transformer to obtain a first vector and the encoded table headers using a second transformer to obtain a second vector;
   concatenating the first vector and the second vector to obtain a combined vector;

processing the combined vector through a linear layer and a Gaussian Error Linear Unit layer to obtain a final query vector;

processing the encoded target types through a third transformer to obtain a third vector; and calculating a score for the target tabular query column as a dot product between the final query vector and the third vector to model interactions between the target tabular query column of the target table and the target types and provide a column-type annotation.

9. The computer system of claim 8, wherein encoding the target tabular query column, the table headers, and the target types independently to generate the permutation invariant representations of the type data and the tabular data associated with the target table further comprises:

linearizing the tabular data;

automatically assigning an increasing sequence of position identifiers to each non-delimiting tokenized cell in the linearized tabular data until a separator token is reached; and in response to reaching the separator token, automatically assigning a monotonically increasing sequence of position identifiers for each non-delimiting tokenized cell positioned after the separator token, restarting from an integer corresponding to 1 greater than the position identifier assigned to the separator token.

10. The computer system of claim 8, wherein the auxiliary information further includes a glossary comprising a short description of the target label type.

11. The computer system of claim 8, wherein encoding the target tabular query column, the table headers, and the target types independently to generate the permutation invariant representations of the type data and the tabular data associated with the target table further comprises:

assigning the target types, associated glossaries, associated parent labels, and associated grand-parent labels different token identifications.

12. The computer system of claim 11, wherein the different token identifications are initialized to two pre-trained token type embeddings of a pre-trained transformer encoder model comprising two token type identifiers.

13. The computer system of claim 8, further comprising:

leveraging a library for large-scale vector-similarity searches to increase a speed of an inferencing step.

14. The computer system of claim 8, wherein the calculated score is determined using a MaxSim function.

15. A computer program product, the computer program product comprising:

one or more computer-readable storage medium and program instructions stored on at least one of the one or more computer-readable storage medium, the program instructions executable by a processor capable of performing a method, the method comprising:

for a target table, encoding a target tabular query column, table headers, and target types independently to generate permutation invariant representations of type data associated with a target ontology and tabular data associated with the target table, wherein encoding the target types further includes encoding associated auxiliary information, wherein the auxiliary information includes a partial taxonomy structure comprising linearized two-hop is-a ancestor labels;

processing the encoded tabular query column using a first transformer to obtain a first vector and the encoded table headers using a second transformer to obtain a second vector;

concatenating the first vector and the second vector to obtain a combined vector;

processing the combined vector through a linear layer and a Gaussian Error Linear Unit layer to obtain a final query vector;

processing the encoded target types through a third transformer to obtain a third vector; and calculating a score for the target tabular query column as a dot product between the final query vector and the third vector to model interactions between the target tabular query column of the target table and the target types and provide a column-type annotation.

16. The computer program product of claim 15, wherein encoding the target tabular query column, the table headers, and the target types independently to generate the permutation invariant representations of the type data and the tabular data associated with the target table further comprises:

linearizing the tabular data;

automatically assigning an increasing sequence of position identifiers to each non-delimiting tokenized cell in the linearized tabular data until a separator token is reached; and in response to reaching the separator token, automatically assigning a monotonically increasing sequence of position identifiers for each non-delimiting tokenized cell positioned after the separator token, restarting from an integer corresponding to 1 greater than the position identifier assigned to the separator token.

17. The computer program product of claim 15, wherein the auxiliary information further includes a glossary comprising a short description of the target label type.

18. The computer program product of claim 15, wherein encoding the target tabular query column, the table headers, and the target types independently to generate the permutation invariant representations of the type data and the tabular data associated with the target table further comprises:

assigning the target types, associated glossaries, associated parent labels, and associated grand-parent labels different token identifications.

19. The computer program product of claim 18, wherein the different token identifications are initialized to two pre-trained token type embeddings of a pre-trained transformer encoder model comprising two token type identifiers.

20. The computer program product of claim 15, further comprising:

leveraging a library for large-scale vector-similarity searches to increase a speed of an inferencing step.

* * * * *